United States Patent
Shim

(10) Patent No.: US 10,138,168 B2
(45) Date of Patent: Nov. 27, 2018

(54) METHOD OF MELT INFILTRATION UTILIZING A NON-WETTING COATING FOR PRODUCING A CERAMIC MATRIX COMPOSITE

(71) Applicant: Rolls-Royce High Temperature Composites Inc., Cypress, CA (US)

(72) Inventor: Sungbo Shim, Irvine, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 0 days.

(21) Appl. No.: 15/404,424

(22) Filed: Jan. 12, 2017

(65) Prior Publication Data

US 2018/0194691 A1 Jul. 12, 2018

(51) Int. Cl.
*B05D 1/18* (2006.01)
*C04B 35/80* (2006.01)
(Continued)

(52) U.S. Cl.
CPC ............ *C04B 35/806* (2013.01); *B05D 1/02* (2013.01); *B05D 1/18* (2013.01); *B05D 1/28* (2013.01);
(Continued)

(58) Field of Classification Search
CPC .......... C04B 35/657; C04B 2235/3826; C04B 2235/5244; C04B 2235/616;
(Continued)

(56) References Cited

U.S. PATENT DOCUMENTS 6,403,158 B1 6/2002 Corman
2005/0244581 A1 11/2005 Thebault et al.
(Continued)

FOREIGN PATENT DOCUMENTS

EP 1 676 824 A1 7/2006
EP 2 657 207 A1 10/2013
(Continued)

OTHER PUBLICATIONS

Ciftja, A., Tangstad, M., and Engh, T.A.; "Wettability of Silicon with Refractory Materials: A Review"; Norwegian University of Science and Technology, Faculty of Natural Science and Technology, Department of Materials Science and Engineering; Trondheim, Feb. 2008; 37 pages.
(Continued)

*Primary Examiner* — Alexander M Weddle
(74) *Attorney, Agent, or Firm* — Brinks Gilson & Lione

(57) ABSTRACT

A method of melt infiltration for producing a ceramic matrix composite comprises applying a non-wetting coating onto one or more outer surfaces of a porous fiber preform. The non-wetting coating comprises a non-wetting material with which molten silicon has a contact angle of at least about 45°. After applying the non-wetting coating, an uncoated portion of the porous fiber preform is immersed into a molten material comprising silicon, and the molten material is infiltrated into the porous fiber preform through the uncoated portion. The non-wetting coating serves as a barrier to inhibit or prevent the molten material from penetrating the one or more outer surfaces. After infiltration of the molten material into the porous fiber preform, the molten material is cooled to form a ceramic matrix composite, and the non-wetting coating is removed.

20 Claims, 2 Drawing Sheets

(51) Int. Cl.
  *C04B 35/657*  (2006.01)
  *C04B 35/628*  (2006.01)
  *B05D 1/02*  (2006.01)
  *B05D 1/28*  (2006.01)
  *F23R 3/00*  (2006.01)
  *F01D 5/28*  (2006.01)
  *F01D 9/02*  (2006.01)
  *F01D 11/00*  (2006.01)
  *C04B 35/573*  (2006.01)

(52) U.S. Cl.
  CPC ...... *C04B 35/573* (2013.01); *C04B 35/62865* (2013.01); *C04B 35/62889* (2013.01); *C04B 35/657* (2013.01); *F01D 5/28* (2013.01); *F01D 5/282* (2013.01); *F01D 9/02* (2013.01); *F01D 11/00* (2013.01); *F23R 3/002* (2013.01); *C04B 2235/3826* (2013.01); *C04B 2235/5244* (2013.01); *C04B 2235/616* (2013.01); *F05D 2220/32* (2013.01); *F05D 2230/10* (2013.01); *F05D 2230/30* (2013.01); *F05D 2230/90* (2013.01); *F05D 2300/2261* (2013.01); *F05D 2300/6033* (2013.01)

(58) Field of Classification Search
  CPC ............ C04B 35/806; C04B 35/62865; C04B 35/62889; F01D 5/282; F01D 9/02; F01D 11/00; F23R 3/002; F05D 2220/32; F05D 2230/10; F05D 2230/30; F05D 2230/90; F05D 2300/2261; F05D 2230/6033; F05D 2300/6033; B05D 1/02; B05D 1/18; B05D 1/28
  USPC ........................................................ 427/419.7
  See application file for complete search history.

(56) References Cited

U.S. PATENT DOCUMENTS

| | | | |
|---|---|---|---|
| 2006/0141257 A1* | 6/2006 | Subramanian | C04B 35/565 428/408 |
| 2016/0009602 A1* | 1/2016 | Brun | B32B 18/00 156/89.26 |
| 2016/0230570 A1* | 8/2016 | Harris | C04B 41/009 |
| 2016/0326064 A1* | 11/2016 | Shim | C04B 35/565 |
| 2017/0341985 A1* | 11/2017 | Magdefrau | C04B 35/62868 |

FOREIGN PATENT DOCUMENTS

| | | |
|---|---|---|
| FR | 2 851 244 A1 | 8/2004 |
| WO | WO 2016/001341 A1 | 1/2016 |

OTHER PUBLICATIONS

Extended European Search Report from European Patent Application No. 17206650.8, dated Jun. 4, 2018 (7 pp.).

* cited by examiner

METHOD OF MELT INFILTRATION UTILIZING A NON-WETTING COATING FOR PRODUCING A CERAMIC MATRIX COMPOSITE

TECHNICAL FIELD

The present disclosure is directed generally to the fabrication of ceramic matrix composites and more particularly to a method to improve the surface quality of silicon carbide (SiC)-based ceramic matrix composites.

BACKGROUND

Ceramic matrix composites, which include ceramic fibers embedded in a ceramic matrix, exhibit a combination of properties that make them promising candidates for industrial applications that demand excellent thermal and mechanical properties along with low weight, such as gas turbine engine components. One of the final steps in the fabrication of a ceramic matrix composite is melt infiltration, in which a molten material is infiltrated into a porous preform that includes the ceramic fibers. To fabricate SiC-based ceramic matrix composites, a molten silicon metal or alloy may be used for melt infiltration. In some cases, silicon surface nodules may be present after melt infiltration, due to volume expansion of residual (unreacted) silicon in the matrix during solidification. Silicon surface nodules can be problematic in terms of dimensional tolerance, machining and environmental barrier coating (EBC) adhesion.

BRIEF SUMMARY

A method of melt infiltration for producing a ceramic matrix composite comprises applying a non-wetting coating onto one or more outer surfaces of a porous fiber preform. The non-wetting coating comprises a non-wetting material with which molten silicon has a contact angle of at least about 45°. After applying the non-wetting coating, an uncoated portion of the porous fiber preform is immersed into a molten material comprising silicon, and the molten material is infiltrated into the porous fiber preform through the uncoated portion. The non-wetting coating serves as a barrier to inhibit or prevent the molten material from penetrating the one or more outer surfaces. After infiltration of the molten material into the porous fiber preform, the molten material is cooled to form a ceramic matrix composite, and the non-wetting coating is removed.

DETAILED DESCRIPTION

A method of fabricating ceramic matrix composites that inhibits or prevents surface nodules from forming during melt infiltration and solidification is described in this disclosure. The method relies on the formation of a removable, non-wetting coating on a porous fiber preform prior to infiltration with a molten material.

Figure 1:
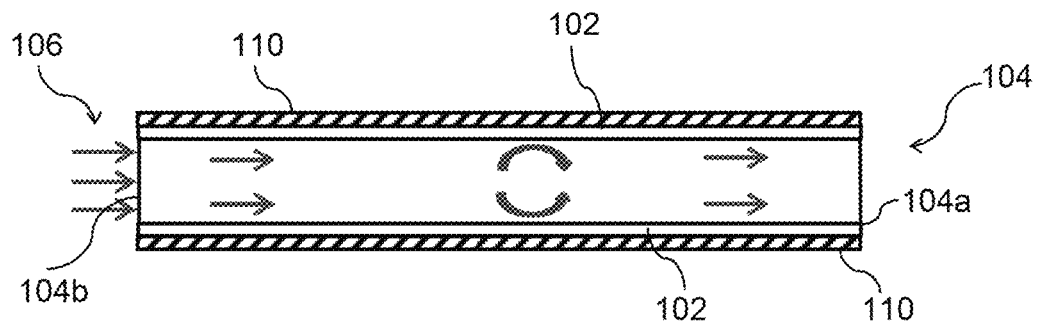
FIG. 1 is a cross-sectional schematic of melt infiltration of a fiber preform including a non-wetting coating and an optional high emissivity coating.

Referring to FIG. 1, the method entails applying a non-wetting coating 102 onto one or more outer surfaces 104a of a porous fiber preform 104. The non-wetting coating 102 comprises a non-wetting material with which molten silicon has a contact angle of at least about 45°. Each outer surface 104a on which the non-wetting coating 102 is applied may be covered in part or in full by the non-wetting coating 102. After application of the non-wetting coating 102, an uncoated surface or portion 104b of the porous fiber preform 104 is brought into contact with a molten material 106 comprising silicon, and the molten material 106 is infiltrated into the porous fiber preform 104 through the uncoated portion 104b. During infiltration of the preform 104, the non-wetting coating 102 serves as a barrier to inhibit or prevent the molten material 106 from infiltrating the one or more outer surfaces 104a. After infiltration, the molten material 106 is cooled (solidified) to form a ceramic matrix composite 108, and the non-wetting coating 102 is removed.

Figures 2A, 2B:
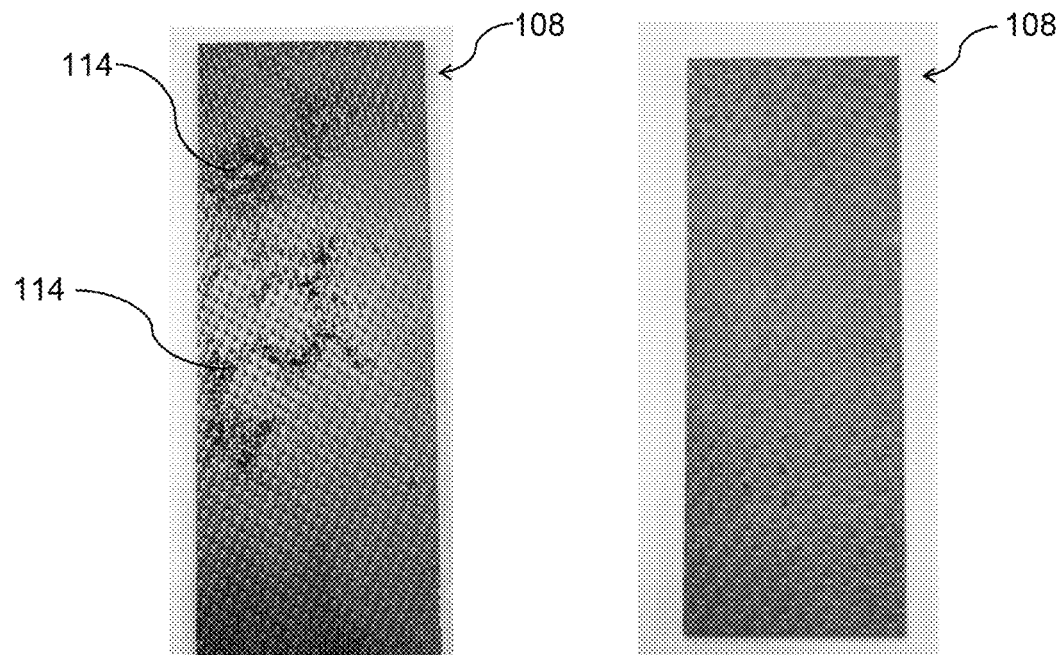
FIG. 2A is a photograph of a surface of a ceramic matrix composite fabricated without a non-wetting coating, and Si surface nodules can be seen.
FIG. 2B is a photograph of a ceramic matrix composite fabricated with a non-wetting coating, and Si surface nodules cannot be seen.

Due to the presence of the non-wetting coating 102 during infiltration and solidification of the melt 106, the formation of surface nodules on the outer surfaces 104a can be reduced or eliminated. FIG. 2A shows a photograph of a surface of a ceramic matrix composite 108 fabricated by melt infiltration without the non-wetting coating; in this image, silicon (Si) surface nodules 114 are apparent. In contrast, FIG. 2B shows a photograph of a surface of a ceramic matrix composite 108 formed by melt infiltration utilizing a non-wetting coating, and Si surface nodules cannot be seen. When the non-wetting coating is utilized, molten silicon may be prevented from penetrating the outer surfaces of the fiber preform during melt infiltration, and the formation of Si surface nodules on the densified composite can be avoid. Thus, a labor-intensive nodule removal step—which can expose the underlying ceramic fiber and lead to degradation of the performance of the ceramic matrix composite—is not required. In contrast to the Si surface nodules, which may be effectively melt-bonded to the surface of the composite upon solidification, the non-wetting coating is not strongly bonded to the preform surface and thus can be readily removed after densification of the composite.

Figure 3:
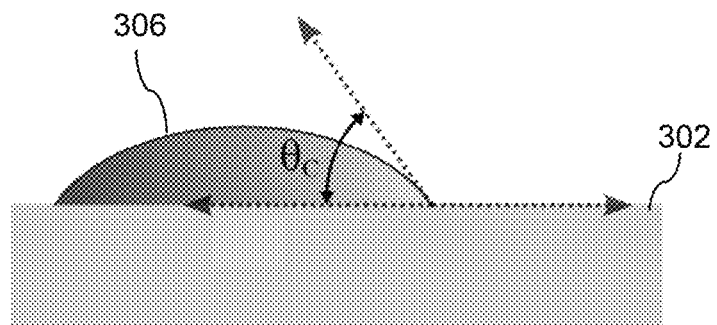
FIG. 3 is a schematic illustrating the contact angle $\theta_c$ of a liquid with a solid.

As would be known to one of ordinary skill in the art, the contact angle ($\theta_c$) of a liquid 306 with a solid 302 may be defined as shown in FIG. 3 and provides a measure of the wettability of the solid 302 by the liquid 306 when the two are placed in contact. In this case, the solid 302 shown schematically in FIG. 3 can be assumed to be the non-wetting coating, and the liquid 306 can be assumed to be molten silicon. As indicated above, the contact angle of molten silicon with the non-wetting coating is at least about 45°, and may be at least about 60°, at least about 75°, or at least about 90°. At such high contact angles, the molten material used for melt infiltration, which is either molten silicon or a silicon-rich alloy, does not wet or strongly adhere to the non-wetting coating, and thus formation of surface nodules can be avoided.

The non-wetting coating 102 may comprise a refractory material with which molten silicon is substantially nonreactive and non-wetting. Generally speaking, ceramic materials such as nitride compounds may be suitable refractory materials for the non-wetting coating. Examples include boron nitride, aluminum nitride and/or silicon nitride. The non-wetting coating 102 may have a thickness in the range from about 1 micron to about 25 microns, and in some cases the thickness may be from about 1 micron to about 5 microns.

Application of the non-wetting coating 102 may entail deposition of a suitable coating formulation followed by drying. Coating methods known in the art, such as spray coating, dip coating, brushing/rolling on, or others may be employed to deposit the coating formulation. The coating formulation may comprise a dispersion of particles (e.g., ceramic particles) in a carrier liquid, such as an aqueous or organic solvent, where the particles comprise the refractory material with which molten silicon is substantially nonreactive and non-wetting. For example, the coating formulation may include boron nitride (BN) particles in water or alcohol with an inorganic binder phase (e.g., alumina, aluminum phosphate, or magnesium silicate); such coating formulations are commercially available as paints or aerosols from a number of vendors. The coating formulation may be deposited on the desired outer surface(s) of the preform and dried under ambient conditions (e.g., at room temperature in an air environment). Room temperature may be understood to encompass a range of temperatures from about 15° C. to about 25° C. Drying of the coating formulation typically occurs within 30 minutes of deposition, and may occur within 10 minutes of deposition. Thus, the non-wetting coating may be formed.

The porous fiber preform 104 to which the non-wetting coating 102 is applied comprises a framework of ceramic fibers. The framework may be a two- or three-dimensional weave of the ceramic fibers, produced using methods known in the art. The porous fiber preform 104 may be an impregnated fiber preform, where the framework of ceramic fibers is loaded with particulate matter. Such an impregnated fiber preform may be formed by infiltrating the porous fiber preform with a particle-based slurry, also using methods known in the art, typically prior to application of the non-wetting coating.

Referring again to FIG. 1, in some cases it may be beneficial to apply a high emissivity coating 110 to the non-wetting coating 102 prior to infiltration of the preform 104 with the molten material 106. The high emissivity coating 110 may comprise a non-reflective material that can counter the reflective properties of the non-wetting coating 102, which may be white or light gray in color. More specifically, during melt infiltration, the presence of the high-emissivity coating 110 can help to enhance heat transfer to the preform 104, thereby avoiding an increase in furnace temperature that might otherwise be required due to the reflectivity of the non-wetting coating 102. Suitable non-reflective materials for the high emissivity coating 110 include carbon, such as carbon black or graphite, or another light-absorbing material.

Application of the high emissivity coating 110 may entail deposition of a suitable coating formulation followed by drying. Coating methods known in the art, such as spray coating, dip coating, and brushing or rolling on, may be employed to deposit the coating formulation. Commercially available coating formulations, such as water- and oil-based dispersions of carbon (e.g., graphite) particles, can be deposited and dried under ambient conditions to form the high-emissivity coating. Drying typically occurs in about 60 minutes or less at room temperature. The high emissivity coating may have a thickness in the range from about 1 micron to about 25 microns, and in some cases the thickness may be from about 1 micron to about 5 microns.

Figure 4:
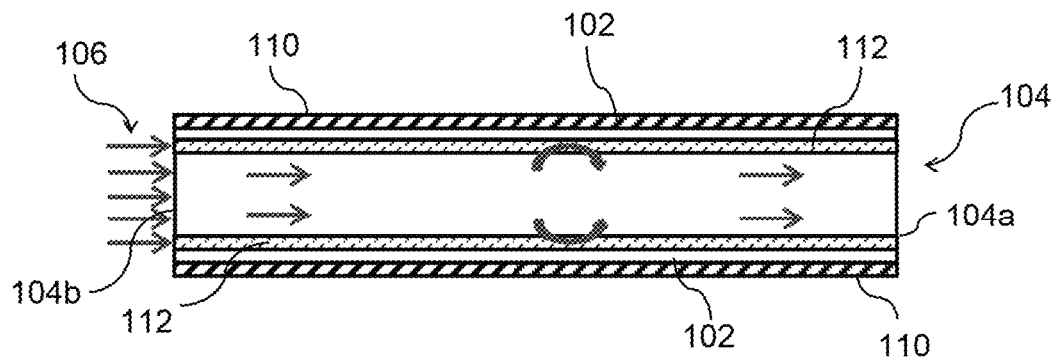
FIG. 4 is a cross-sectional schematic of melt infiltration of a fiber preform including a non-wetting coating, an optional high emissivity coating, and a porous external layer between the fiber preform and the non-wetting coating.

The method may further entail, prior to applying the non-wetting coating 102, applying a porous external layer 112 on the one or more outer surfaces 104a of the preform 104, as shown in FIG. 4. Because the porous external layer 112 may be applied prior to the non-wetting coating 102, the porous external layer 112 is positioned between the outer surface 104a of the preform 104 and the non-wetting coating 102. During infiltration of the fiber preform 104, the porous external layer 112 may serve as a wick to transport the molten material 106 over multiple pathways along the one or more outer surfaces 104a, thereby increasing the speed and efficiency of the infiltration process, as described in U.S. patent application Ser. No. 15/147,209, filed May 5, 2016, which is hereby incorporated by reference in its entirety. In addition, and more importantly, the porous external layer 112 can protect the underlying ceramic matrix composite during removal of the non-wetting coating 102, as discussed below.

The application of the porous external layer 112 to the preform 104 may comprise depositing a surface slurry onto the one or more outer surfaces 104a. The surface slurry may comprise a solvent and particulate solids, which may include ceramic particles and optionally one or more reactive elements. Deposition of the surface slurry may be followed by drying to remove the solvent. The surface slurry may be deposited on the outer surface(s) by any of a number of methods, including dip coating, spray coating, solution casting and/or brushing or rolling on, typically under ambient conditions (e.g., at room temperature). The solvent in which the particulate solids are suspended may be an aqueous or organic solvent, and the surface slurry may further include a binder and/or a dispersant. Drying of the surface slurry may be carried out at room temperature or at an elevated temperature (e.g., from about 40° C. to about 150° C.) in an ambient or controlled environment. After drying, the thickness of the porous external layer 112 may be from about 0.1 mm (~0.005 in) to about 1.0 mm (~0.040 in). The method may further comprise machining the porous external layer 112 prior to and/or after melt infiltration to control the thickness and/or surface finish.

The ceramic fibers that serve as the framework of the fiber preform typically comprise silicon carbide, but may also or alternatively comprise another ceramic, such as silicon nitride, alumina, aluminosilicate, or carbon. The particulate matter contained in the impregnated fiber preform includes ceramic particles that become part of the ceramic matrix after melt infiltration and optionally one or more reactive elements. Typically, the ceramic particles comprise silicon carbide, but they may also or alternatively include silicon nitride, alumina, aluminosilicate, and/or boron carbide or another refractory carbide. In a preferred embodiment, the ceramic fibers comprise silicon carbide, and the ceramic particles (and ultimately the ceramic matrix) also comprise silicon carbide. The ceramic matrix composite that is formed in this case may be referred to as a silicon carbide/silicon carbide or SiC/SiC composite. The particulate solids used to form the optional external porous layer on the surface of the impregnated fiber preform may include the same or different ceramic particles as contained in the porous preform. Typically, the ceramic particles of the external porous layer also comprise silicon carbide. The terms "silicon carbide" and "SiC" used herein refer broadly to the compound SiC as well as to other silicon-containing carbides.

Typically, prior to infiltration with the molten material, the impregnated fiber preform comprises a loading level of particulate matter of from about 40 vol. % to about 60 vol. %, with the remainder being porosity. The majority of the particulate matter comprises ceramic particles, and typically from about 2 wt. % to about 12 wt. % of the particulate matter may be reactive elements. The impregnated fiber preform may be formed by a slurry infiltration process known in the art. Slurry infiltration may further be preceded by a chemical vapor infiltration process and by construction of the fiber preform using fabrication methods known in the art.

After infiltration of the molten material 106 comprising silicon into the porous fiber preform 104, the molten material 106 is cooled, thereby forming a ceramic matrix composite comprising ceramic fibers embedded in a ceramic matrix. The molten material may consist essentially of silicon (e.g., elemental silicon and any incidental impurities) or may comprise a silicon-rich alloy. The temperature at which melt infiltration is at or above $T_m$ of the metal or alloy. In the case of silicon, which has a melting temperature ($T_m$) of 1414° C., the temperature may be from about 1410° C. to about 1500° C. Typically, melt infiltration is carried out for a time duration of several minutes to hours, depending in part on the size and complexity of the composite. The ceramic matrix is formed from the particulate matter in the preform as well as ceramic reaction products created from the reaction between the molten material and any reactive element(s) in the preform. The reactive element(s) may include carbon (e.g., graphite, carbon black, diamond) and/or refractory metals such as molybdenum, tungsten, and/or titanium. Since the reactive elements react with the molten material during melt infiltration, the amount of unreacted metal or alloy (e.g., silicon or a silicon alloy) in the ceramic matrix composite may be minimized. In the case of a SiC/SiC composite formed from a molten material comprising silicon, from about 1 vol. % to about 20 vol. % of the composite may be unreacted silicon, although it is preferred that the amount of unreacted silicon is less than about 10 vol. % or less than about 5 vol. % of the composite.

Due to the presence of the non-wetting coating on one or more outer surface(s) of the preform during melt infiltration, as set forth above, little if any of the unreacted silicon appears on the surface of the composite as surface nodules. Additionally, due to the lack of wettability of silicon with the non-wetting coating, any unreacted silicon that manages to infiltrate the outer surface during melt infiltration can be readily removed. Both the non-wetting coating and any unreacted silicon can be extracted from the outer surface(s) after solidification by abrasive grit blasting or a similar removal technique known in the art. Abrasive grit blasting entails pneumatically accelerating and impinging abrasive particles (e.g., metal shot, sand, glass beads, etc.) against the coated surface, effectively blasting off the non-wetting coating, the high-emissivity coating (if present), and any unreacted silicon, without damaging the underlying composite. If a porous external layer is applied to the preform prior to application of the non-wetting coating, then, after removal of the non-wetting coating, the porous external layer can be machined to the desired thickness and/or surface finish. The porous external layer may also serve to protect the underlying ceramic matrix composite during removal of the non-wetting coating. Thus, the ceramic matrix composite obtained after removal of the non-wetting coating may have a smooth surface devoid of surface nodules, and may find application as a seal segment, a blade, a vane or a combustor liner of a gas turbine engine.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of melt infiltration for producing a ceramic matrix composite, the method comprising:
    applying a coating onto one or more outer surfaces of a porous fiber preform, the coating comprising a material with which molten silicon comprises a contact angle of at least about 45°;
    after applying the coating, immersing an uncoated portion of the porous fiber preform into a molten material comprising silicon, the molten material being infiltrated into the porous fiber preform through the uncoated portion, the coating serving as a barrier to inhibit or prevent the molten material from penetrating the one or more outer surfaces;
    after infiltration of the molten material into the porous fiber preform, cooling the molten material to form a ceramic matrix composite; and
    removing the coating.

2. The method of claim 1, wherein, after removing the coating, the ceramic matrix composite is substantially free of silicon surface nodules.

3. The method of claim 1, wherein the contact angle is at least about 60°.

4. The method of claim 1, wherein the material is selected from the group consisting of boron nitride, aluminum nitride and silicon nitride.

5. The method of claim 1, wherein applying the coating comprises depositing a coating formulation using a deposition method selected from the group consisting of: spray coating, dip coating, brushing on, and rolling on, followed by drying the coating formulation.

6. The method of claim 1, wherein the coating has a thickness in a range from about 1 micron to about 25 microns.

7. The method of claim 6, wherein the thickness is in the range from about 1 micron to about 5 microns.

8. The method of claim 1, wherein removing the coating comprises abrasive grit blasting.

9. The method of claim 1, further comprising, prior to infiltration of the molten material, applying a high emissivity coating comprising a non-reflective material onto the coating.

10. The method of claim 9, wherein the non-reflective material comprises carbon.

11. The method of claim 10, wherein the carbon is selected from the group consisting of: carbon black and graphite.

12. The method of claim 9, wherein applying the high emissivity coating comprises depositing a coating formulation by a deposition method selected from the group consisting of: spray coating, dip coating, brushing on, and rolling on, followed by drying the coating formulation.

13. The method of claim 1, further comprising, prior to applying the coating:
applying a surface slurry onto the one or more outer surfaces of the porous fiber preform, the surface slurry comprising a solvent and particulate solids; and
drying the surface slurry to form a porous external layer comprising the particulate solids on the one or more outer surfaces.

14. The method of claim 13, wherein the porous external layer comprises a thickness of from about 0.1 mm to about 1 mm.

15. The method of claim 13, further comprising machining the porous external layer.

16. The method of claim 13, wherein the particulate solids comprise a ceramic selected from the group consisting of: silicon carbide, silicon nitride and boron carbide, and one or more reactive elements comprising carbon.

17. The method of claim 1, wherein the molten material comprises a silicon-rich alloy.

18. The method of claim 1, wherein the molten material consists essentially of silicon.

19. The method of claim 1, wherein the ceramic matrix composite includes ceramic fibers comprising silicon carbide in a ceramic matrix comprising silicon carbide.

20. The method of claim 1, wherein a component of a gas turbine engine comprises the ceramic matrix composite, the component being selected from the group consisting of: seal segment, blade, vane and combustor liner.

* * * * *